Sept. 22, 1959 M. C. KIDD ET AL 2,905,747

SECRECY SYSTEMS

Filed Sept. 22, 1953 3 Sheets-Sheet 1

INVENTORS
Marshall C. Kidd &
James J. Davidson
BY [signature]
ATTORNEY

INVENTORS
Marshall C. Kidd &
James J. Davidson
BY
ATTORNEY

INVENTORS
Marshall C. Kidd &
James J. Davidson
BY [signature]
ATTORNEY

United States Patent Office 2,905,747

Patented Sept. 22, 1959

2,905,747

SECRECY SYSTEMS

Marshall C. Kidd, Haddon Heights, and James J. Davidson, Audubon, N.J., assignors to Radio Corporation of America, a corporation of Delaware Application September 22, 1953, Serial No. 381,672

7 Claims. (Cl. 178—5.1)

The present invention relates to improvements in communication secrecy systems, and more particularly, although not necessarily exclusively, to improvements in signal garbling systems suited to the secret transmission of sound broadcasts over public communication channels.

More directly, the present invention relates to improvements in a subscriber television type sound garbling system suitable for encoding or disguising the sound information generally accompanying a television broadcast to an extent requiring specialized yet simple equipment at the television receiver in order to decode and successfully employ the sound information.

Many systems may be found in the prior art for encoding or garbling the transmission of sound information over a communication channel. In many such systems satisfactory coding of sound information is accomplished only at the expense of considerable circuit complexity involving the use of rather expensive filters. The employment of these circuits in sound television broadcast, therefore, becomes impracticable due to the necessary added expense of home receiving equipment having the facility of successfully receiving and descrambling the garbled sound signal.

One of the simplest known methods for producing garbling of an intelligence signal such as a speech signal, is to heterodyne the intelligence signal with a carrier having a frequency above the highest intelligence signal frequency it is desired to communicate. The carrier and but one of its sidebands is then transmitted to the receiving terminal. The main difficulty with this system resides in the fact that although the signal actually communicated to the receiving terminal is garbled, it is possible through the expediency of a simple non-linear device, such as a diode to detect the carrier and one sideband and thereby at least partially reconstruct the original intelligence waveform. Thus, should a simple frequency inversion system of this type be employed in television sound broadcast inherent non-linearities in the sound channel of a standard television receiver would permit some degree of recovery of the sound information.

The above disadvantages of a frequency inversion sound scrambling system have been overcome to a considerable extent by the present invention. According to the present invention the sound signal to be garbled is heterodyned with a supersonic carrier. The resultant lower sideband components along with the supersonic carrier are then transmitted over the sound channel of a television system. There is further provided, in accordance with the present invention, at least one masking signal which is linearly combined with the resultant sideband and carrier. The frequency of this masking signal lies below the lowest frequency of the carrier-sideband combination to be transmitted. Under such conditions non-linear detection of the entire broadcast signal will produce an audible note corresponding to the masking signal which will tend to mask out any information derived from demodulation of the carrier and sideband.

In further accordance with the present invention, advantage is taken of the requirement that a masking signal be transmitted along with the carrier-sideband version of the sound signal by arranging the masking signal or signals used in the system to correspond to useful signal information (such as coding control pulses for a scrambled television system). These audible signals are, by means of suitable filters, removed at the receiver and directly applied to the control of signal decoding equipment. Filter means are further provided for extracting and detecting the carrier and sideband signals to derive decoded sound information for application to the conventional sound channel of the television receiver.

It is an object of the present invention to provide a signal secrecy system.

It is another object of the present invention to provide an improved electrical signal secrecy system suited for use in disguising or garbling the sound channel of standard television broadcasts.

It is another object of the present invention to provide an improved intelligence signal and coding system which demands a minimum of circuit complexities for both encoding and decoding processes.

It is further an object of the present invention to provide a television sound secrecy system in which characteristics of the garbled signal relied upon for secrecy in sound transmission are also employed to control the possible decoding of garbled television signals.

Other objects and features of advantage of the present invention as well as a better understanding of its nature and mode of operation will be obtained from a reading of the following specification, especially when taken in connection with the accompanying drawings, in which:

Figure 1 is a block diagram representation of the basic form of signal garbling system provided by the present invention.

Figures 1*a* and 1*b* show diagrammatically the frequency relationships.

Figure 1:
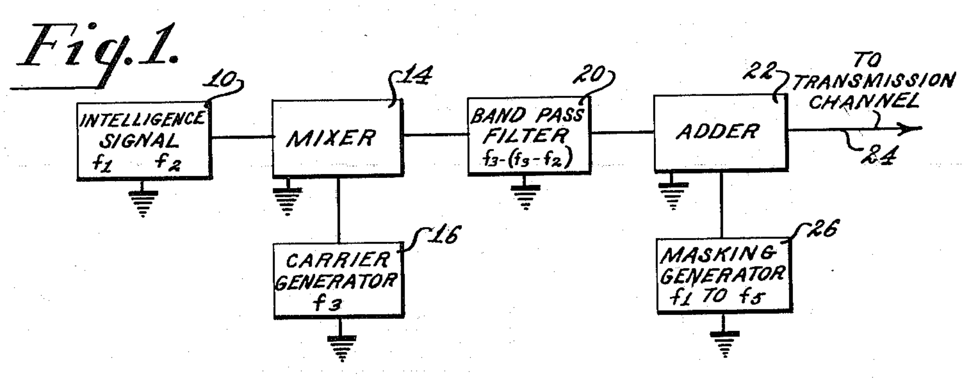
Figure 1A:
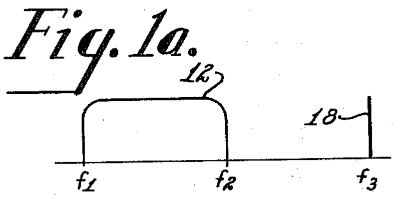

Turning now to Figure 1, there is illustrated at 10 a source of intelligence signal which is to be transmitted to a remote location on a secrecy basis. For purposes of illustration, the frequency components of the intelligence signal have been arbitrarily designated as extending between the frequency $f_1$ and $f_2$. The band of intelligence signals is graphically illustrated in Figure 1*a* by the curve 12. In accordance with the present invention, the intelligence signal is applied to a non-linear mixer circuit 14 in which a carrier derived from a carrier generator 16 is caused to heterodyne with the components of the intelligence signal. The frequency of the carrier has been illustratively designated as $f_3$ and is indicated at 18 in Figure 1*a*. The heterodyne products appearing at the output terminal of the mixer 14 are applied to a band-pass filter 20 having a band-pass width substantially equal to one sideband of the modulation products produced in the mixer 14. For this purpose the band-pass filter 20 has been illustratively designated as having a band-pass numerically equal to $f_3$ minus $(f_3-f_2)$ which would correspond to either the upper or lower sideband spectrum width. The band-pass characteristics of filter 20 are further adjusted to include the mixer frequency $f_3$. The output signal from the filter 20 is then applied to a linear signal adding circuit 22 whose output terminal 24 is designated for transmission to a signal transmission channel such as for example a radio broadcast transmitter.

Figure 1B:
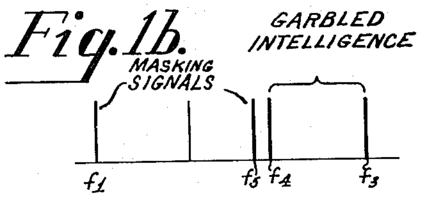

In further accordance with the present invention, there is added on a linear basis to the signal derived from the filter 20 a masking signal having a signal frequency or signal frequencies falling in the frequency range below the lowest frequency component of the signal passed by the filter 20. In Figure 1*b* there is illustrated the condition existing in the practice of the present invention, where the band-pass filter 20 is designated to pass the lower sideband of the modulation products produced by the mixer 14. The masking signal generator 26 may then be productive of a signal or signals having frequencies in the band $f_1$ to $f_5$ where the frequency $f_5$ is below the lowest frequency $f_4$ of the lower sideband $f_4$—$f_3$. Under these conditions non-linear detection of the signal produced by the adder 22 will yield a garble of the lower sideband of the intelligence signal heterodyne modulation products and beats between the frequency components of the masking signal produced by the masking generator 26.

Figure 2:
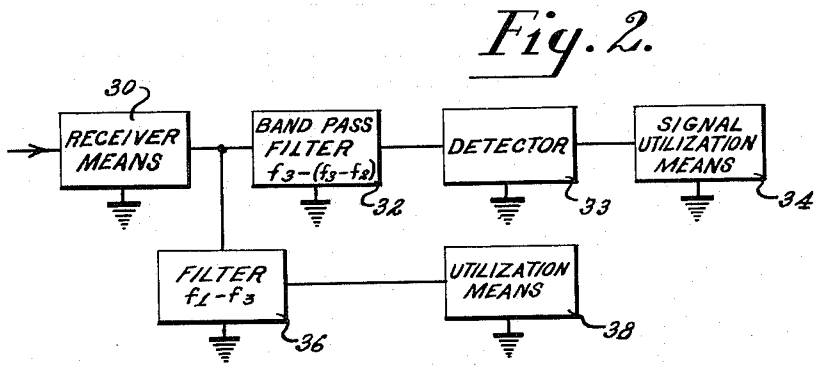
Figure 2 is a block diagram representation of circuit elements arranged to receive and descramble the secrecy signal produced by the circuitry of Figure 1.

In order to properly receive and degarble the signal produced by the arrangement of Figure 1, an arrangement comparable to the structure of Figure 2 must be employed. A receiver means 30 is provided for receiving garbled intelligence signal from a transmission channel. If it is assumed that the received garbled signal has the characteristics of the signal produced at the output terminal of the adder circuit 22 in Figure 1, described above, the output of the receiver means 30 will be applied to a band-pass filter 32 having a bandwidth corresponding to one sideband. If the lower sideband components of the heterodyne modulation products in Figure 1 were transmitted to the receiver means, the band-pass filter 32 should be designed to accept these lower sideband products and convey them to a detector 33. The output circuit of the detector will then provide demodulated intelligence signals to the signal utilization means 34. No interference will occur between the masking signal and the lower sideband products due to the fact that the filter 32 will prevent the masking signal from reaching the detector 33. If the masking signal is used as an intelligence communicating agency, the output of the receiver means 30 may also be applied to a filter 36 having a band-pass characteristic embracing those masking signals relied upon to communicate intelligence. Thus, the output signal from the filter 36 may be applied to a second utilization means 38 to provide a function independent of the signal utilization means 34.

Figure 4:
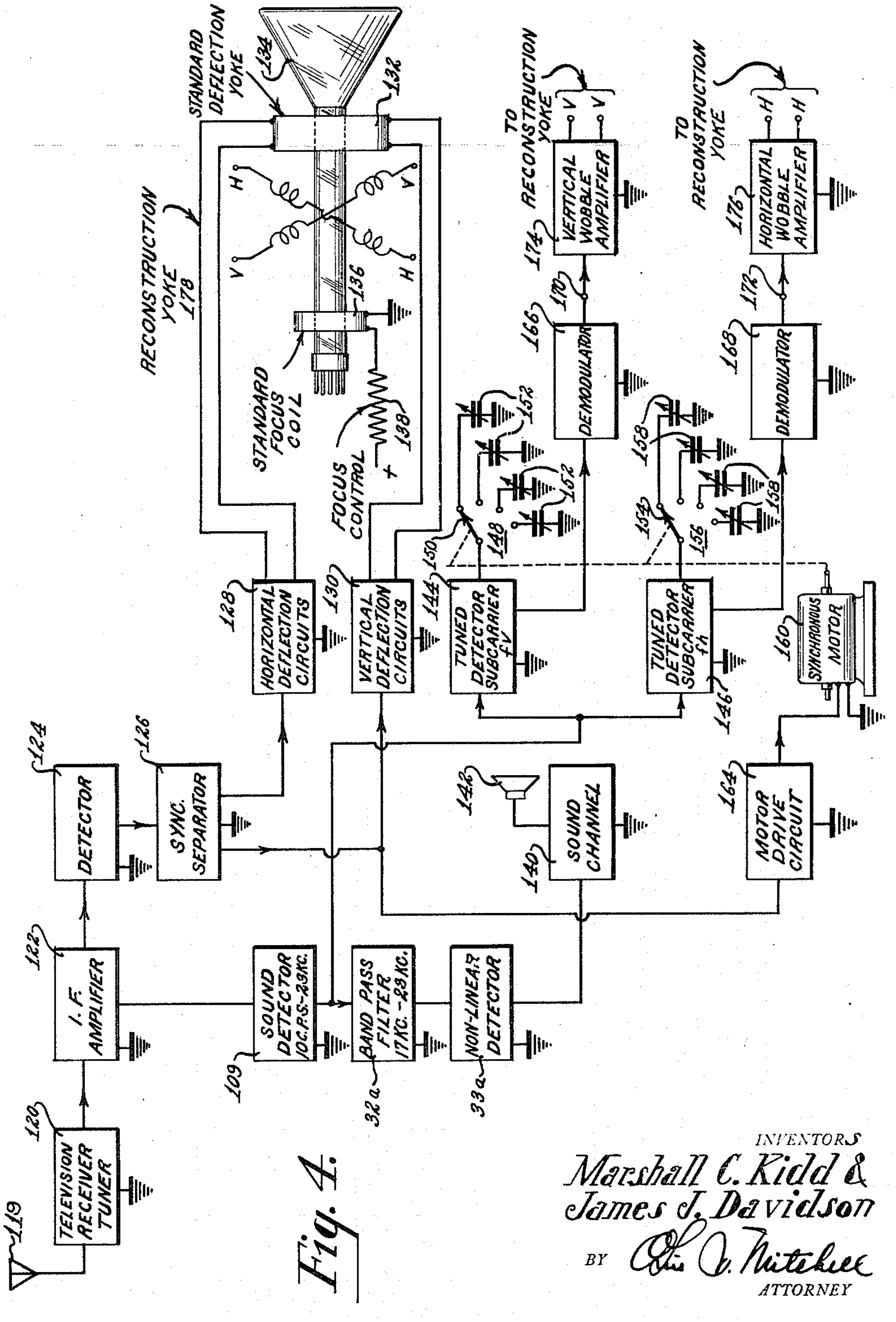
Figure 4 is a block diagram representation of one form of combined receiving and signal reconstruction arrangement for both television and sound channels embodying the novel features of the present invention.
Figure 3:
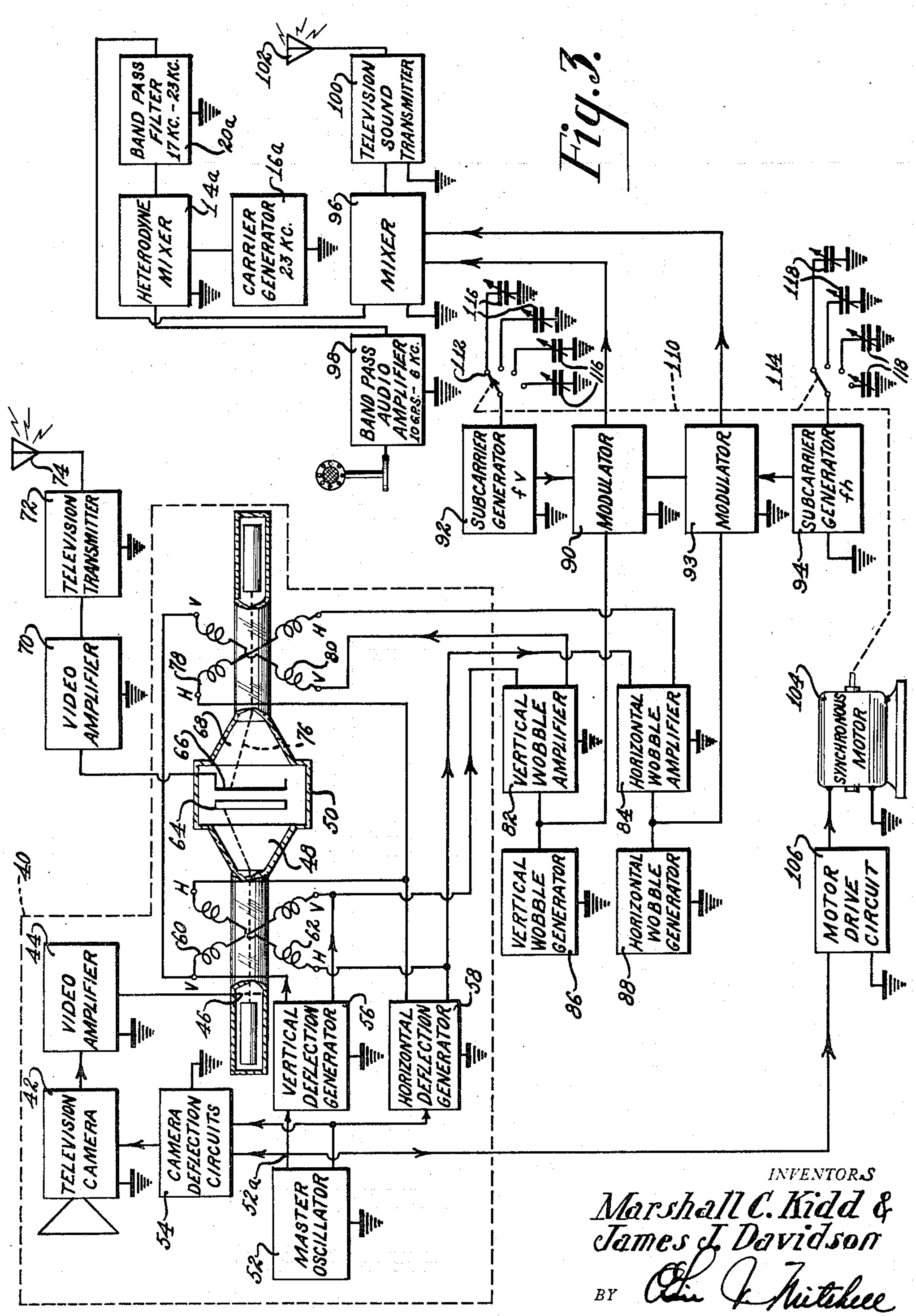
Figure 3 is a block diagram representation of one form of television picture scrambling and sound scrambling transmitter arrangement in which the present invention finds embodiment.

The novel application of the above described principles of the present invention to a subscriber television system, whereby to provide simultaneous transmission of garbled television signal and garbled sound signal is shown in Figures 3 and 4.

Although the present invention as illustrated and embodied in Figures 3 and 4 pertains mainly to the scrambling and descrambling of the sound broadcast accompanying television broadcasts, the arrangements of Figures 3 and 4 will be considered on an overall basis with particular attention to the present invention being drawn after a complete understanding of the general system has been reached.

In Figure 3 it will be noted that rectangular scanning means is provided which comprises a vertical and horizontal deflection system. Within the dotted line area 40 is shown a conventional television camera 42, adapted to feed a conventional video amplifier 44 whose output is in turn applied to the input 46 of the writing section 48 of a conventional storage tube 50. Deflection for the television camera 42 is timed by the master oscillator 52 whose horizontal and vertical timing signals are applied to camera deflection circuits at 54. Vertical and horizontal timing signals are also applied to the vertical and horizontal deflection generators 56 and 58 employed for the deflection of the storage tube 50. As shown, the output of the vertical deflection generator 56 is applied to the vertical deflection coils 60 of the writing section of the storage tube 50. The output of the horizontal deflection generator 58 is correspondingly applied to the horizontal deflection coils 62 of the writing section of the storage tube 50. By this means, the image picked up by the television camera 42 will be faithfully written on the target 34 of the storage tube 50.

The output electrode 66 of the reading section 68 of the storage tube 50 is connected with the input of video amplifier 70 whose output is in turn connected to modulate television video transmitter 72. The output of the transmitter 72 is applied to some form of television broadcast antenna 74. Deflection for the reading beam 76 of the storage tube 50 is supplied by the horizontal and vertical deflection coils at 78 and 80. If the deflection signal through the deflection coils 78 and 80 were linear and identical in waveform to signals supplied to the writing deflection coils 60 and 62, it is manifest that the video signal applied to the video amplifier 70 would be substantially identical to the video signal appearing at the output of television camera 42.

In further accordance with the arrangement of Figure 3 the deflection voltage applied to the reading deflection coils 78 and 80 of the storage tube 50 is a composite signal made up of the combination of the deflection waveform appearing at the output of the vertical and horizontal deflection generators 56 and 58 and the corresponding wobble waveforms appearing at the output of the vertical and horizontal amplifiers at 82 and 84. For this purpose, it can be seen that the horizontal reading deflection coil 78 is connected with the output of the horizontal deflection generator 58 through a series connection with the output of the horizontal wobble amplifier 84. Likewise, the vertical reading deflection yoke 80 is supplied with the output of the vertical deflection generator 56 through the series connection of the output of the vertical wobble amplifier 82. The actual waveform of the wobble signal applied to the vertical and horizontal wobble amplifiers is determined by corresponding wobble generator circuits indicated at 86 and 88. The signals produced by the vertical and horizontal wobble generators 86 and 88 may be made to assume any convenient waveform.

To afford means at the receiving end of reconstructing the thus scrambled television picture, the vertical and horizontal wobble signals must be communicated to the receiving location. This may be done in accordance with the present invention, by transmitting the vertical and horizontal wobble information in the form of masking signals for garbled sound transmission, in accordance with the systems of Figures 1 and 2. Thus, in accordance with Figure 3, the vertical wobble generator signal in addition to being applied to the vertical wobble amplifier 82 is also applied to a modulator 90 which acts to modulate a subcarrier signal produced by the subcarrier generator 92. Correspondingly, the output of the horizontal wobble generator 88 is applied to modulator 93 which amplitude modulates the signal produced by another subcarrier generator 94. For purposes of convenience in describing the present invention, the instantaneous frequencies of the subcarrier generators 92 and 94 have been designated as $f_H$ and $f_V$. The frequencies $f_H$ and $f_V$ would fall in the range between $f_1$ and $f_2$ in Figure 1*a* and positions within this range so that no substantial harmonic content resulting from carrier modulation will fall outside this range. Output signals from the modulators 90 and 93 are fed to a mixer amplifier 96 which superimposes the carriers $f_V$ and $f_H$ upon the heterodyne garbled audio signal components applied to the mixer 96.

The garbling of the audio signal information delivered by the audio amplifier 98 is accomplished in substantially the same manner as described in Figure 1. For purposes of convenience, the heterodyne mixer, the carrier generator, and band-pass filter in Figure 3 have been given numerical designations similar to their counterparts of Figure 1*a* and consequently appear respectively as **14*a*, 16*a* and 20*a*. By way of example, the audio frequency signals to be garbled have been indicated as occupying a range of 10 c.p.s. to 6 kc. A carrier generator frequency of 23 kc. has been arbitrarily assigned to the carrier generator 16*a* and a band-pass filter characteristic of 17 kc. to 23 kc. has been assigned to the filter 20*a*. This permits the lower sideband of the modulated 23 kc. carrier to be passed to the mixer 96 for combination with the subcarriers $f_V$ and $f_H$. Purely by way of example, the subcarriers $f_V$ and $f_H$ may be respectively assigned frequencies of 1 kc. and 4 kc. It will, therefore, be seen that in accordance with the principles of the present invention illustrated in connection with Figure 1, the signal applied to the television sound transmitter 100 of Figure 3 will comprise two subcarrier signals $f_V$ and $f_H$ of the lower sideband modulation products with carrier delivered by the bandpass filter 20*a***. If the amplitudes of the subcarrier signals are of sufficiently high magnitude, arbitrary non-linear detection of the broadcast composite sound signal will, therefore, yield nothing but a useless garble of lower sideband sound modulation products related to the 23 kc. carrier and the masking subcarrier signals $f_V$ and $f_H$.

In order to achieve security in the transmission of the scrambled television signals, the frequencies of the subcarriers $f_V$ and $f_H$ may be periodically changed in accordance with a predetermined schedule known only to broadcast station personnel and those television receiver owners subscribing to the television descrambling service.

For example, a synchronous motor 104 driven by a motor drive circuit 106 in turn receiving synchronizing information in the nature of vertical drive pulses from the master oscillator 52 may be caused to change the frequency of the subcarrier generators by means of a mechanical linkage 110. The mechanical linkage illustrated by the dotted line 110 is shown as coupling the synchronous motor 104 with the armatures 112 and 114 of frequency changing switches respectively associated with the subcarrier generators 92 and 94. By way of illustration, these switches have been shown as being of the multi-position type allowing their armatures 112 and 114 to contact variable capacitor sets 116 and 118 whose values determine the frequency of subcarrier generators. It will be seen that by calibrating on an index basis each member of the sets of capacitors 116 and 118 and permitting their particular settings and sequences of settings for a given broadcast to be known to a receiver owner having a complementary tuned subcarrier detection means, the reconstruction of the vertical and horizontal wobble signals may be realized at a receiver location. On the other hand, any receiver owner not being able to follow the changes in the subcarrier frequencies $f_V$ and $f_H$ will be unable to reproduce the vertical and horizontal wobble waveforms and thereby be without means for reconstructing a television image.

One form of television receiving arrangement embodying the novel features of the present invention and eminently suitable for faithfully reconstructing the television image and sound broadcast transmitted by the arrangement of Figure 1 is illustrated in Figure 4. Here a standard television receiving antenna 119 is connected to provide a standard television receiver tuner 120 with television broadcast signals including the television sound signal.

The output of tuner 120 is applied to a standard superheterodyne intermediate frequency amplifier 122 whose output is detected by the detector 124 and applied to a standard sync separator circuit 126. The horizontal sync signals provided by sync separator 126 are applied for control of the horizontal deflection circuit 128 while the vertical synchronizing signals are applied to vertical deflection circuits 130. Outputs of the horizontal and vertical deflection circuits are conventionally connected to what may be standard television deflection yoke 132. Embracing kinescope 134, in accordance with well known practice, and positioned on the neck thereof is a standard focus coil 136 with means 138 for controlling the beam focusing current through the same.

It will be recognized that that portion of the receiving circuit described thus far, with respect to Figure 2 is completely standard in all respects, and that the circuits in the blocked elements may be of any well known type such as shown in an article entitled, "Video Receiver Circuits Simplified," appearing in the magazine "Tele-Tech" for January 1949.

In accordance with the particular security system illustrated by Figures 3 and 4, it will be seen that the output signal of the intermediate frequency amplifier 122 in Figure 3 is applied to a sound detector 109 whose output signal is delivered to the series combination of a high pass filter **32*a* and non-linear detector 33*a*, respectively corresponding to the elements 32 and 33 or Figure 2. Output signal from the sound detector 33*a* may be directly applied to the sound channel 140 which terminates at the loud speaker 142. The output signal from the sound detector 109 is also applied to the tuned detectors 144 and 146 respectively responsive to the subcarrier frequencies $f_V$ and $f_H$ transmitted by the system of Figure 3. The tuned detector circuits 144 and 146 may be in any convenient form as long as their responsive frequencies may be varied mechanically. By way of example, the tuned detector circuits 144 and 146 are shown connected with the multi-position switches 148 and 150 having selector arms 152 and 154. These selector arms operate on two separate banks of capacitors 156 and 158 whose counterpart may be found in the capacitor banks 116 and 118 in Figure 3. The selector arms 152 and 154 are driven by a synchronous motor 160 controlled by a drive circuit 164 which in turn receives its timing information from the vertical sync output of the sync separator 126. Thus when the receiver is in operation the synchronous motor 160 in Figure 4 will be in exact synchronism with motor 104 in Figure 3 and the selector arms on the switches 148 and 150 may be made to move in exact synchronism with the arms 112 and 114 in Figure 3. Small deviations from synchronized motion between transmitter and receiver selector arms may be compensated by providing a phase adjustment, not shown, between the selector arms and motor stator at the receiver. It can be seen, therefore, that by properly phasing the action of the arms 112 and 114 in Figure 3 with the arms 152 and 154 in Figure 4 and also adjusting individual values of capacitors in each of the banks 156 and 158 in Figure 4, the tuned detectors 144 and 146** can be made to follow the shifts in wobble subcarrier frequencies $f_V$ and $f_H$ produced at the transmitter.

The outputs of the tuned detectors 144 and 146 are then applied to respective conventional demodulator circuits 166 and 168 at whose output terminals 170 and 172 will appear whatever forms of wobble signal are produced by the vertical and horizontal wobble generators 86 and 88 at the transmitter. The then demodulated vertical and horizontal wobble signals are then applied to some form of amplifier circuit such as indicated by the blocks 174 and 176 designated as vertical and horizontal wobble amplifiers.

It will, therefore, be seen that the novel signal garbling system of the present invention lends itself quite readily to subscriber television systems, in that the masking signals employed by the present invention to prevent simple non-linear detection of sound modulated carrier sideband components may be otherwise utilized to convey the coding information relative to the garbling mode of the television picture signal as accomplished by other means.

What is claimed is:

1. In a signal secrecy system, the combination of: a source of intelligence signal having signal components falling between the frequency $f_1$ and $f_2$ where $f_2$ is of a higher frequency than $f_1$; a source of carrier signal carrier having a frequency $f_3$ higher than $f_2$; means for non-linearly combining said carrier with said intelligence signals to produce heterodyne components including said carrier and at least one sideband; a source of masking signal having signal frequencies confined to the range $f_1$ to $f_2$; signal adding means connected with said masking signal source and said non-linear combining means whereby to linearly combine said masking signal components with said carrier and said sideband signal; and means connected with said last named means designated to apply the resultant signal produced by said linear combining means to a communication channel having a frequency response characteristic permitting the passing of frequencies falling in the range $f_1$ to $f_2$ and including said carrier $f_3$ along with its associated sideband.

2. In a subscriber television system employing a garbled signal including a sound modulated supersonic carrier with only one associated sideband and at least one key signal of audible frequency linearly combined with said carrier and sidebands and itself bearing modulation depicting the mode of television picture garble; the combination comprising signal receiving means designated to deliver said carrier, said one associated sideband and said key signal; filter means connected with said receiving means for passing only said carrier and sideband to the exclusion of said key signal and its conditional modulation products; signal detecting means having a non-linear signal translating characteristic connected with said filter means for demodulating said carrier and sideband; sound reproducing means connected with said detecting means for audibly reproducing the sound signal intelligence defined by said carrier and sideband; controllable television picture descrambling means coupled with said receiving means; further filter means connected with said receiving means for passing only said key signal; and means connected with said last named means and said descrambling means for controlling said descrambling means in accordance with said key signal.

3. In a subscriber television system, the combination of: a source of garbled television signal; means for transmitting said garbled television signal to a remote location; a source of key decoding signal representing the mode of television signal garbling; a source of audio frequency tone; means for modulating said audio frequency tone with said key signal, said modulation producing upper and lower sideband components; a source of sound signal for accompaniment to the television broadcast; a sound signal transmitting means for communicating sound frequency signals to said remote location, said sound signal transmitting means having a frequency response characteristic permitting the transmission of signal frequencies above the highest audible sound frequency it is desired to audibly reproduce at said remote location; a source of carrier signal having a frequency above the highest audible sound frequency it is desired to reproduce at said remote location and yet within the transmission range of said sound signal transmitting means; means for modulating said carrier signal with said sound signal to produce upper and lower sideband modulation products, the exact frequency value of said carrier being such that the lowest practical frequency component of said lower sideband is above the upper sideband of said audio frequency tone modulation; filter means connected with said last named means for passing only said carrier signal and said lower sideband to produce a sound garble signal; means for linearly combining said sound garble signal with said modulated audio frequency tone and its upper and lower sideband components to form a composite key-sound garble signal; and signal coupling means from said last named means to said sound transmitting means for communicating said composite key-sound garble signal to said remote location.

4. A subscriber television system according to claim 3, wherein there is provided at said remote location means for receiving said garbled television signal and composite key-sound garble signal; television picture reproducing means coupled with said receiving means for reproducing said garbled television signal under the control of a key decoding signal; first filter means connected with said receiving means for passing key signals and excluding said carrier signal and lower sideband; means coupling said first filter means to said picture reproducing means to control the reproduction of a television picture; second filter means connected with said signal receiving means for passing substantially only said carrier and associated sideband; detector means coupled with said second filter for detecting the signal passed thereby; and sound signal reproducing means coupled with said detector.

5. In a secrecy television transmission system the combination of: a source of coded television signals; a source of uncoded sound signals representing sound accompaniment for a scene depicted by said television signals; a source of unmodulated television picture carrier signals of radio broadcast frequency; means modulating said coded television signals upon said television picture carrier for radio communication of said coded television signals by a radio broadcast signal having predetermined sidebands; a source of unmodulated television sound carrier signal of a broadcast radio frequency close to said picture carrier but outside said sidebands; means for modulating said sound carrier with signal frequencies corresponding to said sound signals and also with signal frequencies above the highest sound frequency it is desired to broadcast in accompaniment to said television scene; a source of subcarrier signal having a frequency substantially above said highest sound frequency but of a value within the range of sound carrier modulating means; means coupled with said sound signal source and said subcarrier signal source for modulating said subcarrier signal with sound signals to produce a sound modulated subcarrier having upper and lower sidebands; means including electrical filter apparatus for selecting from said modulated subcarrier said subcarrier and components of said lower sideband; a source of masking audio frequency signal having a frequency below the selected components of said lower sideband; means linearly combining said masking audio frequency signal with the signals selected by said filter means to form a composite signal; and means applying said composite signal to said sound carrier modulating means for broadcast thereof in accompaniment to the broadcast of said modulated television picture carrier.

6. In a secrecy television receiver for receiving and decoding a radio broadcast picture carrier modulated with a coded television signal and for receiving and transducing a radio broadcast television sound carrier modulated with a composite signal representing masked television sound information, said composite signal comprising a sound modulated subcarrier signal linearly combined with an audio frequency masking signal, said subcarrier signal having a frequency above the highest sound frequency it is desired to reproduce in accompaniment to decoded television pictures while frequency of said audio frequency masking signal is established below the lowest effective sideband component of said subcarrier signal, the combination of: means responsive to receive television picture carrier for decoding said television signal and producing a television picture; means for demodulating said broadcast radio sound carrier to produce said composite signal, a sound reproducing channel including an audio frequency amplifier; electrical filter means coupled to said demodulating means, said filter means having a pass band characteristic which selects from said composite signal said subcarrier and associated sideband frequencies to the relative exclusion of said audio masking signal; nonlinear signal detecting means coupled with the output of said filter means for demodulating said sound modulated subcarrier; and means applying said demodulated sound carrier signal to said sound channel for reproduction of unmasked television sound in accompaniment to decoded television pictures.

7. A secrecy television receiver according to claim 6 wherein said audio frequency masking signal depicts television picture coding information and wherein there is additionally provided means responsive to substantially only the masking signals appearing at the output of said radio sound carrier demodulating means to develop an electrical control signal representing the mode of television picture coding; and means coupling said control signal to said television picture carrier responsive means for controlling the decoding of said coded television picture signal.

References Cited in the file of this patent

UNITED STATES PATENTS

| | | |
|---|---|---|
| 1,223,376 | Espenshied | Apr. 24, 1917 |
| 2,567,545 | Brown | Sept. 11, 1951 |
| 2,605,397 | Cheek | July 29, 1952 |
| 2,645,677 | Young | July 14, 1953 |
| 2,656,406 | Gray | Oct. 20, 1953 |
| 2,656,411 | Morris et al. | Oct. 20, 1953 |
| 2,664,460 | Roschke | Dec. 29, 1953 |